(12) United States Patent
Itzkowitz

(10) Patent No.: US 10,945,550 B2
(45) Date of Patent: Mar. 16, 2021

(54) COOLING MULTI-COOKER

(71) Applicant: The Steelstone Group, LLC, Brooklyn, NY (US)

(72) Inventor: Binyumen Itzkowitz, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 0 days.

(21) Appl. No.: 16/289,913

(22) Filed: Mar. 1, 2019

(65) Prior Publication Data
US 2019/0269272 A1 Sep. 5, 2019

Related U.S. Application Data

(60) Provisional application No. 62/637,142, filed on Mar. 1, 2018.

(51) Int. Cl.
| | | |
|---|---|---|
| *A23L 5/10* | (2016.01) | |
| *A47J 27/00* | (2006.01) | |
| *A47J 36/32* | (2006.01) | |
| *A47J 36/16* | (2006.01) | |
| *F25B 21/02* | (2006.01) | |

(52) U.S. Cl.
CPC ............. *A47J 27/004* (2013.01); *A23L 5/10* (2016.08); *A23L 5/15* (2016.08); *A47J 36/16* (2013.01); *A47J 36/321* (2018.08); *F25B 21/02* (2013.01)

(58) Field of Classification Search
CPC ........ A47J 27/004; A47J 36/16; A47J 36/321; A47J 41/0038–41/005; A23L 5/15; A23L 5/10; F25B 21/02; F25B 21/04
See application file for complete search history.

(56) References Cited

U.S. PATENT DOCUMENTS

| | | | | |
|---|---|---|---|---|
| 2,504,794 A | * | 4/1950 | Berman | F25D 23/12 165/267 |
| 5,771,788 A | * | 6/1998 | Lee | A21C 13/00 99/468 |
| 6,038,865 A | * | 3/2000 | Watanabe | A23L 3/36 62/258 |
| 7,174,720 B2 | * | 2/2007 | Kennedy | A47J 27/004 62/3.3 |
| 7,872,214 B2 | | 1/2011 | Schandel et al. | |
| 2004/0222212 A1 | * | 11/2004 | Yang | F24C 15/105 219/449.1 |

(Continued)

FOREIGN PATENT DOCUMENTS

| | | |
|---|---|---|
| GB | 2525011 A | 10/2015 |
| JP | H09108096 A | 4/1997 |

(Continued)

OTHER PUBLICATIONS

International Search Report issued by the International Searching Authority for corresponding International Patent Application No. PCT/US 2019/020228, dated Jun. 27, 2019.

*Primary Examiner* — Drew E Becker
(74) *Attorney, Agent, or Firm* — Myers Wolin, LLC

(57) ABSTRACT

A cooker including: an inner pot; a cooling system coupled to the inner pot for cooling the inner pot; a heating system coupled to the inner pot for heating the pot; and a processor configured to control the cooling system and the heating system according to a programmed sequence.

20 Claims, 9 Drawing Sheets

(56) References Cited

U.S. PATENT DOCUMENTS

| | | | | |
|---|---|---|---|---|
| 2005/0044625 | A1* | 3/2005 | Kommers | E03C 1/18 |
| | | | | 4/654 |
| 2006/0237182 | A1* | 10/2006 | Godecker | A47J 39/02 |
| | | | | 165/253 |
| 2009/0152258 | A1* | 6/2009 | Schandel | A47J 27/004 |
| | | | | 219/385 |
| 2014/0044851 | A1* | 2/2014 | Kennedy | A47J 27/004 |
| | | | | 426/523 |
| 2016/0123660 | A1* | 5/2016 | Peng | H05B 3/68 |
| | | | | 219/623 |
| 2017/0027365 | A1* | 2/2017 | Mendonca Vilela Pinto Ferreira | A47J 36/321 |
| 2017/0099977 | A1* | 4/2017 | Liu | A47J 27/62 |
| 2018/0028012 | A1* | 2/2018 | Junge | F25B 13/00 |
| 2018/0064281 | A1* | 3/2018 | Collins | A47J 27/10 |
| 2018/0333006 | A1* | 11/2018 | Bassill | F25B 21/04 |
| 2019/0174945 | A1* | 6/2019 | Oti | A47J 43/046 |
| 2019/0216252 | A1* | 7/2019 | Shi | A47J 27/004 |
| 2020/0009520 | A1* | 1/2020 | Kellenberger | A23G 9/12 |
| 2020/0191450 | A1* | 6/2020 | Ladner | F25B 21/02 |

FOREIGN PATENT DOCUMENTS

| | | |
|---|---|---|
| JP | H10127487 A | 5/1998 |
| KR | 101795310 B1 | 11/2017 |
| RU | 132 324 U1 | 9/2013 |
| RU | 145 444 U1 | 9/2014 |
| RU | 2 532 149 C1 | 10/2014 |

* cited by examiner

COOLING MULTI-COOKER

CROSS-REFERENCE TO RELATED APPLICATIONS

This application claims the benefit of U.S. Provisional Application No. 62/637,142, filed Mar. 1, 2018, the contents of which are incorporated by reference herein.

FIELD OF THE INVENTION

The present invention relates to cookware and methods for heating food, and more particularly to a cooling multi-cooker that is capable of keeping food cold until the food is ready to be cooked.

BACKGROUND

A multi-cooker is an electric kitchen appliance for automated cooking using a timer. A typical multi-cooker can perform many cooking functions, such as boiling, simmering, baking, frying, roasting, stewing, and steaming. The device is operated by placing ingredients inside, selecting the corresponding program, and leaving the multi-cooker to cook according to the program, typically without any need for further user intervention. In addition to cooking programs, a multi-cooker may have functions to keep food warm, reheat it or to cook it at a later time. Some multi-cookers can also function as slow cookers.

However, existing multi-cookers do not have a cooling function. Therefore, to prevent spoilage, a user has to put the food ingredients into the cooker shortly before the desired cooking time. However, to put the food ingredients into the cooker around the desired cooking time may not be convenient because, for example, the user is still at work at that time. Putting the food ingredients into the cooker before the user leave for work in the morning may result in the food going bad because of a long duration without refrigeration. Therefore, there is a need for a cooker that is capable of keeping the food cold until the food is ready to be cooked.

SUMMARY

To meet the above long-felt need, an embodiment of the present invention provides a multi-cooker that contains many cooking functions such as rice, sous-vide, bake, etc. In addition, this unit is capable of keeping the food cold until the food is ready to be cooked. This way, a user can prepare the raw food in the pot at night and place the pot/food in the refrigerator. In the morning the user can then place the pot/food in the main unit and go away (e.g., to work). The unit will keep the food cold until the designated cooking time. Then the unit will automatically switch into cooking mode and heat up the food. The unit is also Wi-Fi capable so that the user can remotely control the unit and change modes remotely.

One embodiment of the present invention provides a cooker including: an inner pot, a cooling system coupled to the inner pot for cooling the inner pot, a heating system coupled to the inner pot for heating the pot; and a processor configured to control the cooling system and the heating system according to a programmed sequence.

The cooling system may comprise a first heatsink configured to draw heat from the inner pot, a second heatsink configured to dissipate heat into an environment, and a heat transfer model for transferring heat from the first heatsink to the second heatsink. The heat transfer module may be a peltier module, and a fan may be provided to enhance heat dissipation into the environment.

The heating system and the cooling system may be incorporated into the inner pot, or they may be incorporated into an outer pot, such that the inner pot nests within the outer pot. The first heatsink may comprise a portion mounted to an inner wall of the outer pot, and the portion may be shaped to conform with an outer wall of the inner pot for thermal coupling.

The heating system may comprise a resistive heating element installed at an inside bottom surface of the outer pot, such that when inserted into the outer pot, the inner pot sits directly above the resistive heating element.

A method is further provided in which the food is located in a first pot, such as the inner pot discussed above, heat is extracted from the first pot during a first time period in a cooling configuration, the first pot is transitioned from the cooling configuration to a heating configuration, and then applying heat to the first pot during a second time period. In such a method, heat is extracted from the first pot during the first time period by way of the cooling system and heat is applied to the first pot during the second time period by way of a heating system.

As discussed above, the heating and cooling system may be embedded into a second outer pot. Accordingly, in some embodiments, the first pot is placed into the second pot and the first time period is initiated.

DETAILED DESCRIPTION OF THE PREFERRED EMBODIMENTS

Figure 1:
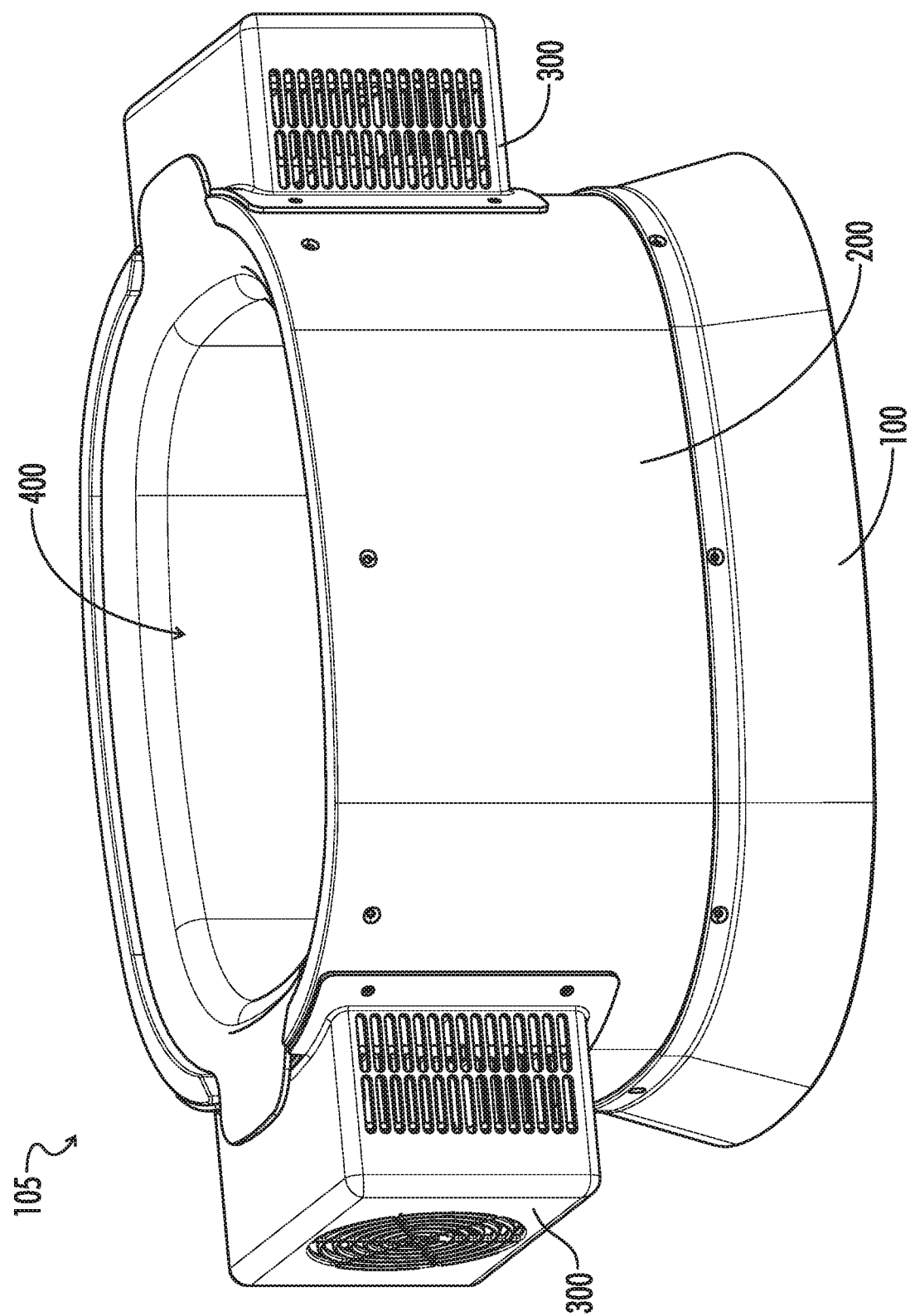
FIG. 1 is an overview of a cooker according to a first embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Below is an example operation of a cooker unit according to an embodiment. The unit contains an inner pot where food is placed. The pot with food may be placed in the refrigerator and the food and pot are kept cold accordingly. At the desired time, the cold inner pot containing the food may then be placed into an outer pot. The inner pot is then kept cool by a cooling system until the food is ready to be cooked. At the designated cooking time, the unit switches from a cooling configuration to a heating configuration and heats up the food with a heating system.

The cooling system and heating system are typically two separate unconnected systems. The cooling system and heating system may operate at different times, as desired. In one embodiment, the cooker includes a processor configured to control the cooling system and heating system according to a programmed sequence. The control may include power level, start time and end time of the respective cooling system and heating system.

In one embodiment, the cooling system includes a heat transfer module which transfers heat from the inner pot to the outside surrounding of the cooker. In one embodiment, the heat transfer module is a Peltier module, or thermoelectric module.

Brief Description of a Peltier Module:

When a DC electrical current is applied to the leads of the Peltier, one side of the Peltier gets hot while the other side gets cold. In effect, the Peltier is 'sucking' the heat from the cold side and passing it on to the hot side. The Peltier keeps on taking the heat energy from the cold side and passing the energy to the hot side. The hot side then heats up and the heat must be removed. A heatsink and fan combination may be used to dissipate the heat from the hot side into the surrounding environment. This way, the cold side can be kept cold, at a temperature below the surrounding atmosphere.

The cold side of the Peltier is attached to one or more heatsinks, or in this case, sometimes referred to as 'coldsinks' because it is on the cold side of the Peltier. These coldsinks come into contact with (or in close proximity of) the inner pot containing the food and draw the heat out of the pot with food. This way the food can continuously be kept cold.

FIG. 1 shows an overview of a cooker 105 according to an embodiment. As can be seen from FIG. 1, the cooker 105 includes a base 100, a main body 200, one or more heatsink assembly 300 and an inner pot 400. Food is placed in the inner pot 400 of the cooker 105 for cooking, and the inner pot is typically removable from the main body 200. The main body 200 comprises an outer pot 220 and typically comprises a cooling system coupled to the inner pot for cooling the inner pot, a heating system coupled to the inner pot for heating the pot, and a processor configured to control the cooling system and the heating system according to a programmed sequence. Each of these elements are discussed in more detail below.

Figure 2:
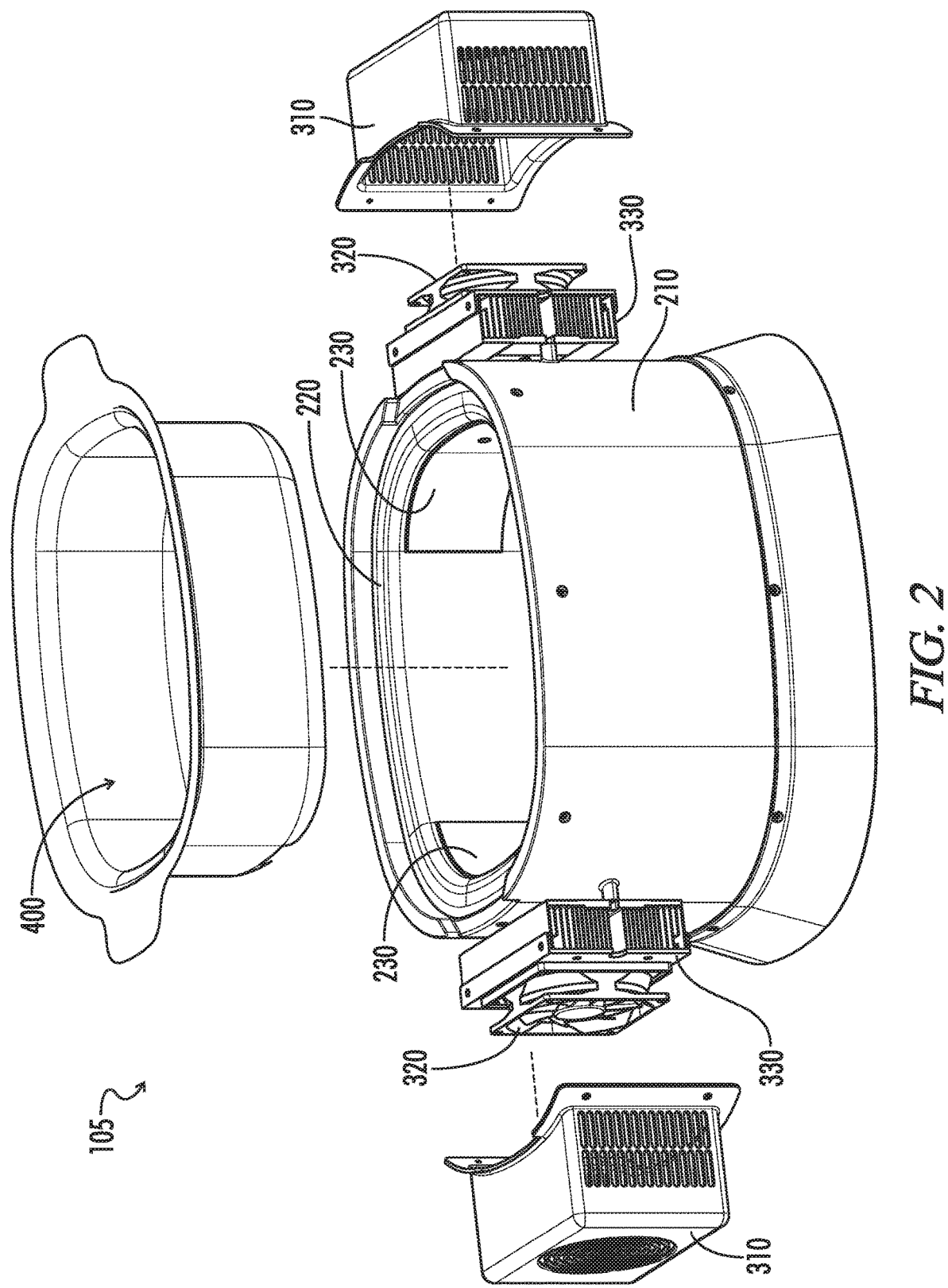
FIG. 2 is a semi-exploded view of the cooker of FIG. 1.

FIG. 2 shows a semi-exploded view of the cooker 105 of FIG. 1. As can be seen from FIG. 2, inside the outer casing 210 is an outer pot 220. The inner pot 400 nests with the outer pot 220. On the inside wall of the outer pot 220 there is a first heatsink 230 (in this case also referred to as a 'coldsink'), a portion of which is shaped to have high thermal coupling with the outside wall of the inner pot so that heat can be efficiently drawn from the inner pot by the 'coldsink' 230. The heatsink assembly 300 includes a heatsink cover 310, a fan 320 and a second heatsink 330. The heatsink cover 310 protects the user from the second heatsink 330. The fan 320 increases the flow of air and thus increases the dissipation of heat into the atmosphere. The heatsink assemblies are attached to the outer casing 210.

Figure 3:
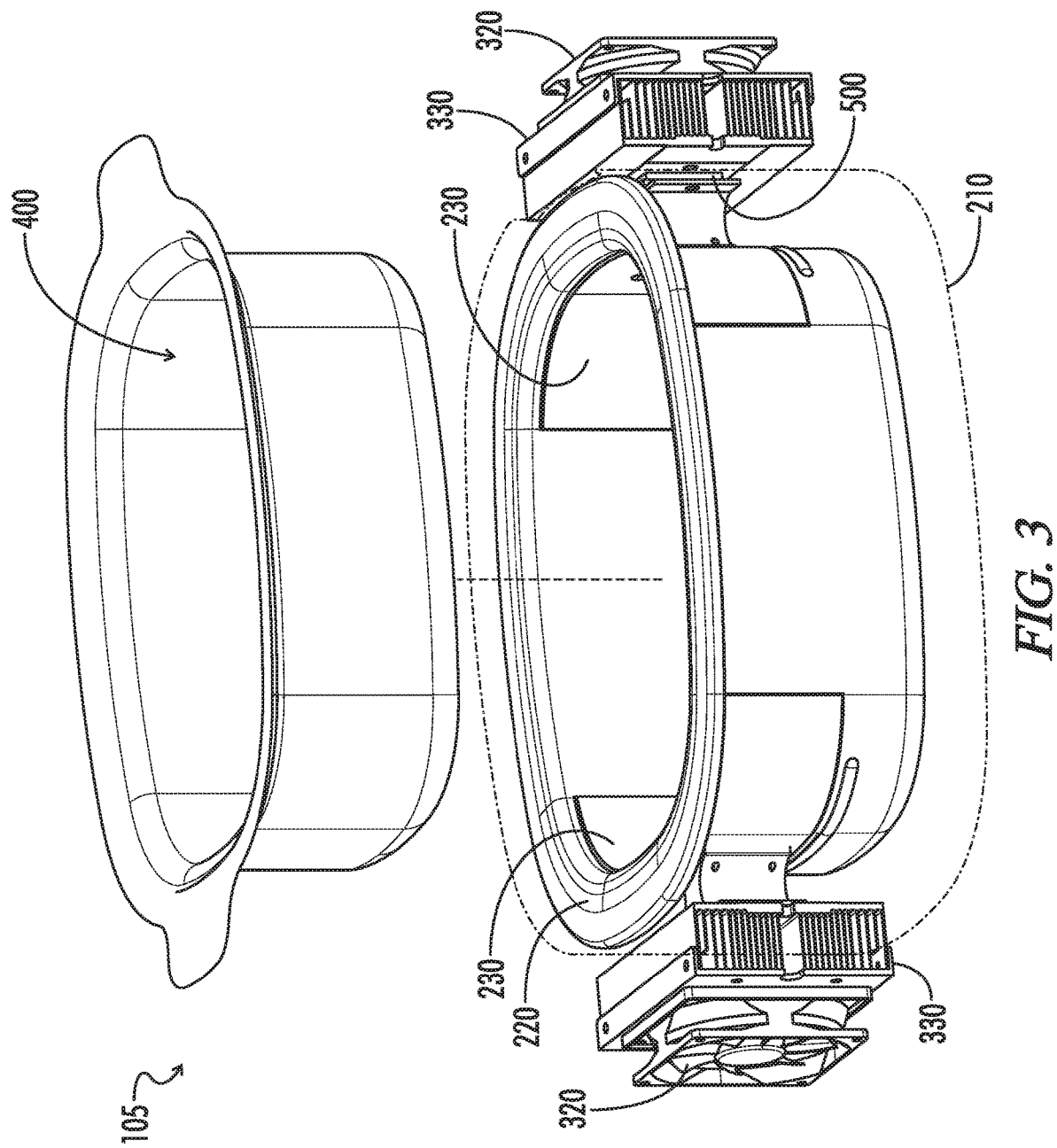
FIG. 3 is a view of inner parts of the cooker of FIG. 1.

FIG. 3 shows cooker 105 of FIG. 1, with portions rendered transparent. As can be seen in FIG. 3, a cooling system, which is typically coupled to the inner pot 400 for cooling the inner pot 400, comprises a first heatsink ('coldsink' 230) configured to draw heat from the inner pot 400, a second heatsink 330 configured to dissipate heat into an environment, and a heat transfer module, such as a peltier module 500, with a cold side of the heat transfer module coupled to the first heatsink ('coldsink') 230 and the hot side of the heat transfer module coupled to the second heatsink 330. The cooling system may further comprise a fan 320 for accelerating the dissipation of heat from the second heatsink 330.

Figure 4:
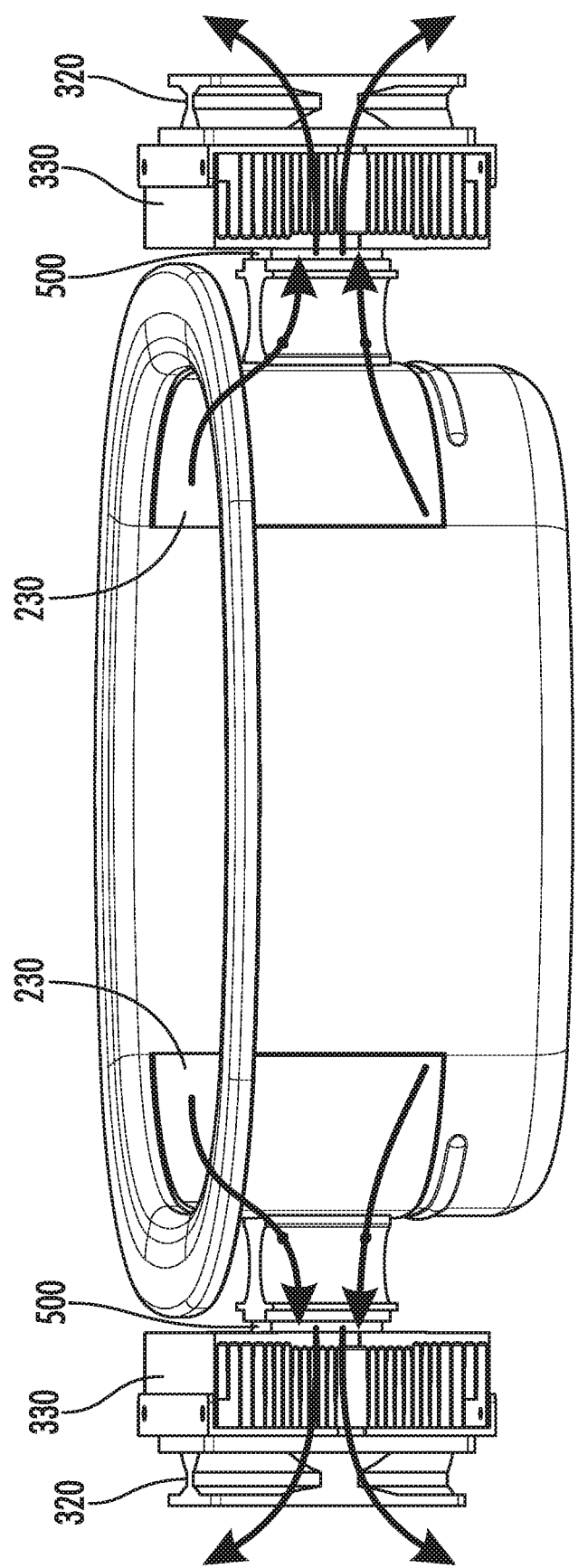
FIG. 4 is a view of inner parts of the cooker of FIG. 1.

In this way, the heat transfer module 500 transfers heat from the first heatsink 230 to the second heatsink 330. FIG. 4 shows the cooker of FIG. 1 with portions of the main body 200 removed, and illustrates heat flow in and around the cooling system. As can be seen from FIG. 4, heat is extracted from the inner pot 400 through the first heatsink ('coldsink') 230, and transfers into the cold side of the heat transfer module 500. The second heat sink 330 then extracts heat from the hot side of the heat transfer module 500, and the heat escapes into the atmosphere via the second heatsink 330. The fan 320 is used to increase the heat dissipation from the second heatsink 330.

Figure 5:
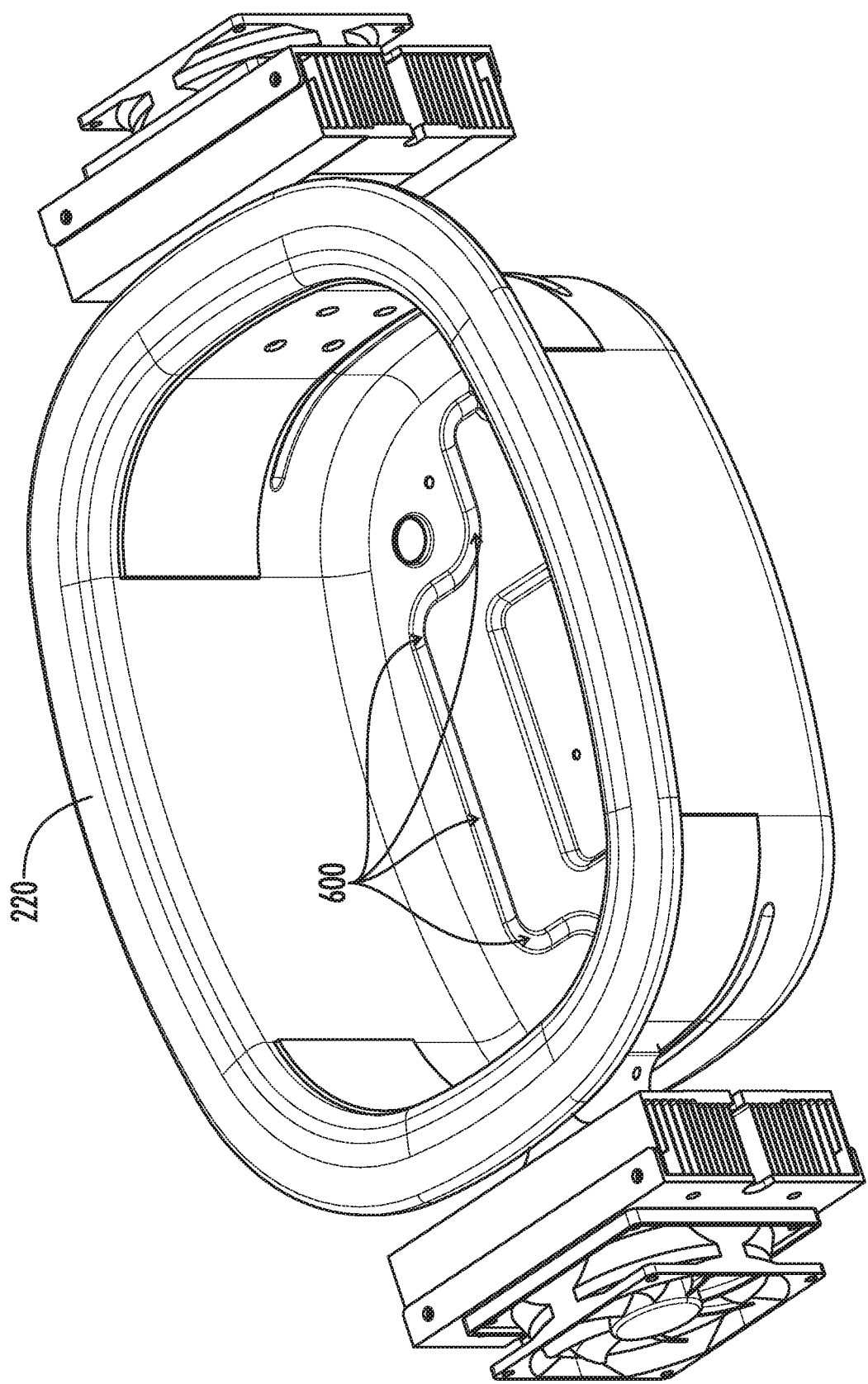
FIG. 5 is a view of the heating elements installed in the cooker of FIG. 1.

FIG. 5 shows the cooker 105 of FIG. 1, with the portions of the main body 200 removed. As can be seen in FIG. 5, the heating system comprises a heating element 600 installed on the inside bottom of an outer pot 220. The inner pot 400 then rests directly above the heating element 600 when nested with the outer pot 220. The heating element 600 heats up the food in the inner pot 400 when the cooking starts. In one embodiment, the heating system uses a resistive heating element to heat the food to very hot temperatures.

While the cooker 105 is shown and described as comprising an inner pot 400 and an outer pot 220, with the cooling system and the heating system typically incorporated into the outer pot 220, it will be understood that in some embodiments, the cooling system and the heating system are integrated into or fixed to the inner pot, such that the cooker may be a single unit with all electronics integrated therein.

The processor is configured to control at least one of power levels, start times, and end times for each of the cooling and heating systems. Accordingly, the processor may sequence the use of the cooling system and the heating system such that the cooling system is applied to the inner pot 220 for a first time period and the heating system is applied to the inner pot 220 for a second time period. In one embodiment, the cooker includes a user interface, such as buttons, switches, touch screen, etc., for receiving inputs from the users. In one embodiment, the cooker includes a wireless communication module, such as Wi-Fi, Bluetooth, infrared, etc., for receiving input from a remote control unit, mobile phone or smart home device. These devices may include a cooker control app, or software program.

Figure 6:
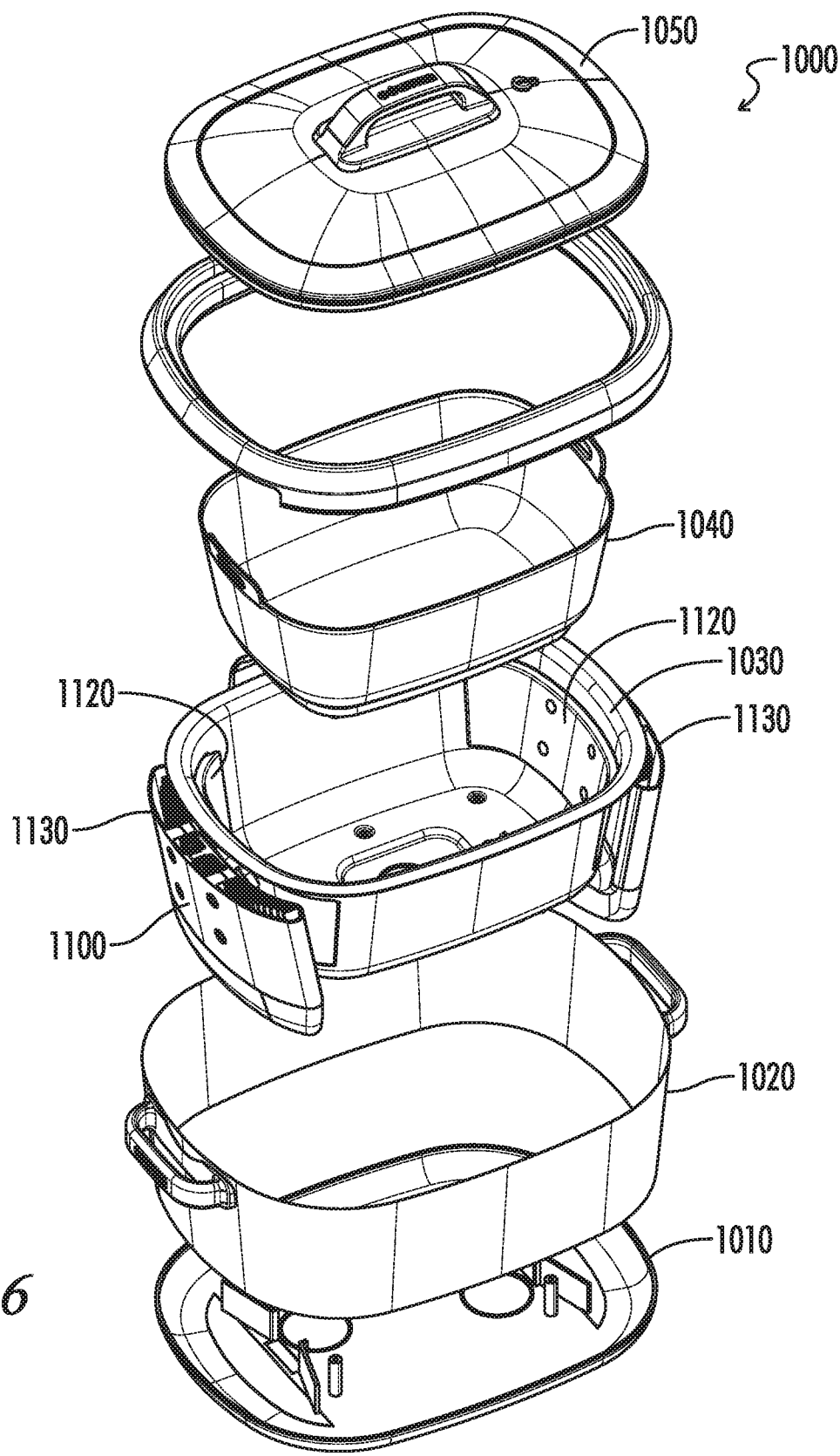
FIG. 6 is a semi-exploded upper perspective view of a cooker according to a second embodiment.
Figure 7:
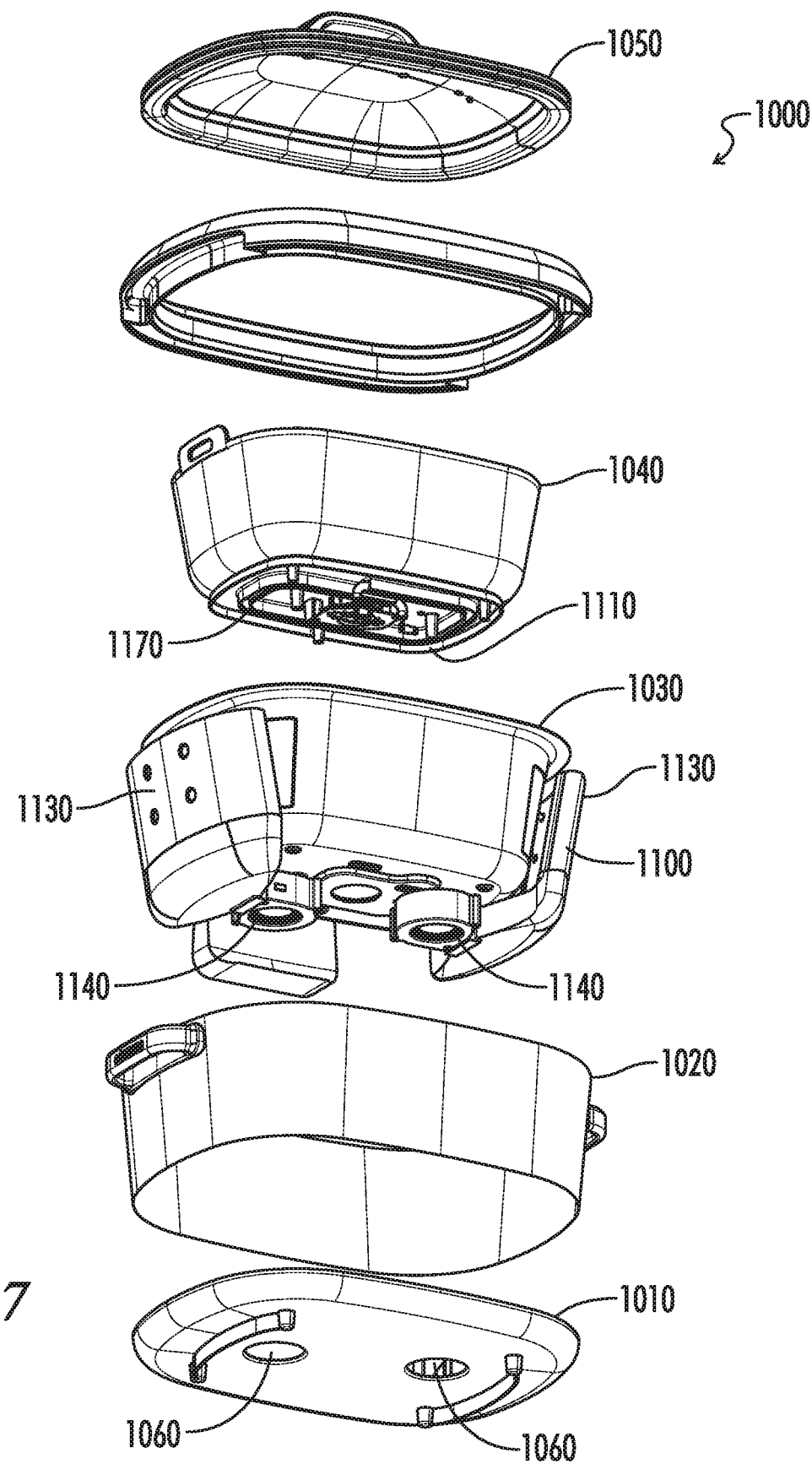
FIG. 7 is a semi-exploded lower perspective view of a cooker according to the second embodiment.
Figure 8:
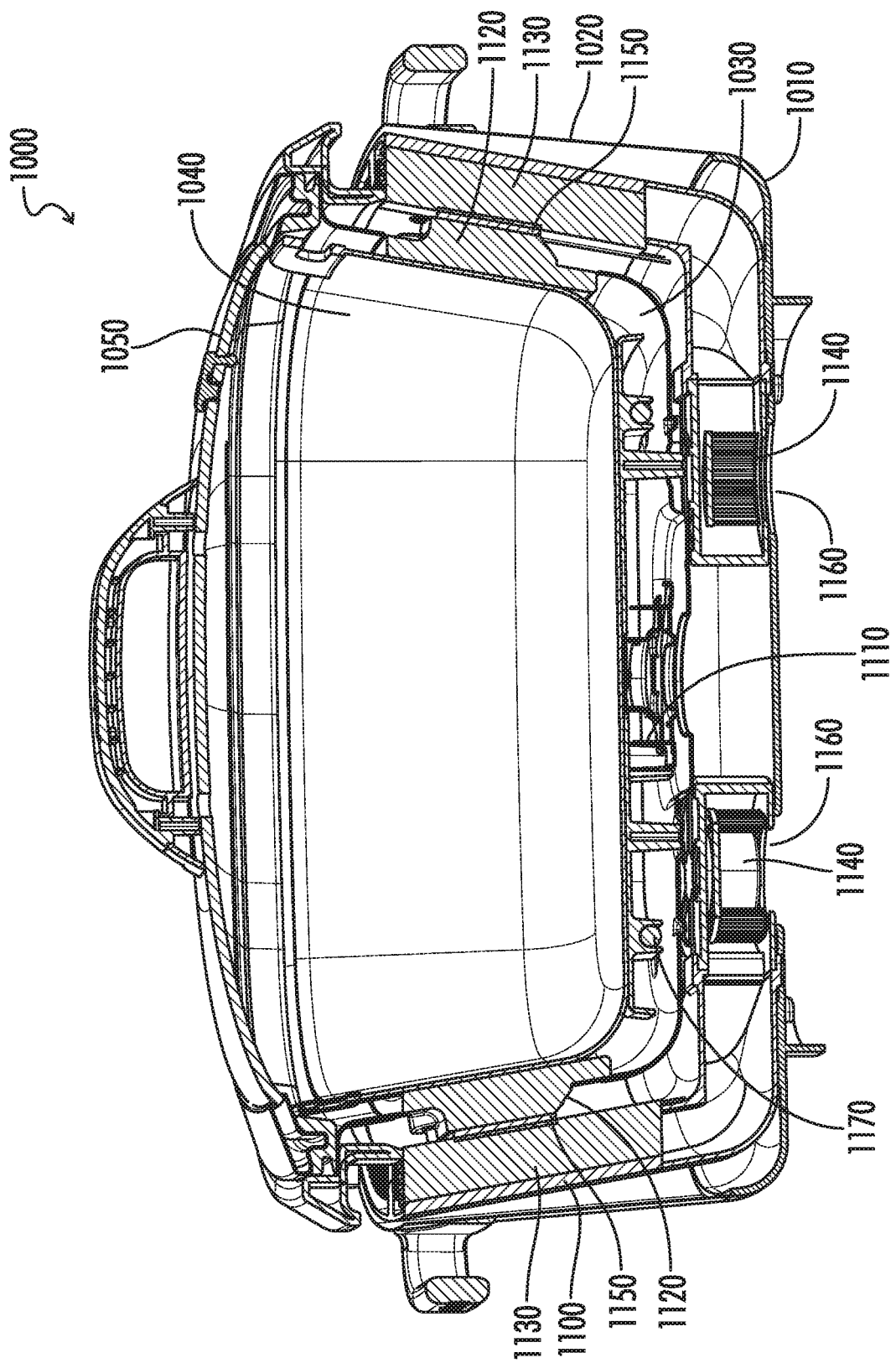
FIG. 8 is a sectioned view of the second embodiment of the cooker.

FIG. 6 is a semi-exploded upper perspective view of a cooker 1000 according to a second embodiment, FIG. 7 is a semi-exploded lower perspective view of a cooker 1000 according to the second embodiment, and FIG. 8 is a sectioned view of the second embodiment of the cooker 1000. As shown, the cooker 1000 typically comprises a base 1010, a main body 1020, an outer pot 1030 installed within the main body and containing an associated cooling system and heating system, an inner pot 1040, and a lid 1050.

As shown, the cooling system 1100 and the heating system 1110 may be discrete systems, and multiple cooling assemblies or systems may be provided. Each cooling system 1100 may comprise a first heatsink 1120, a portion of which is shaped to have high thermal coupling with the outside wall of the inner pot 1040 so that heat can be efficiently drawn from the inner pot by the heatsink. The cooling system 1100 may further comprise a second heatsink 1130, a fan 1140, and a heat transfer module 1150, such as a peltier module. Accordingly, the first heatsink 1120 is configured to draw heat from the inner pot 1040, the second heatsink 1130 dissipates heat into an environment, and the heat transfer module 1150 transfers heat from the first heatsink 1120 to the second heatsink 1130, thereby transforming the first heatsink into an effective 'coldsink.'

The fan 1140 may force air across the second heatsink 1130, thereby accelerating the dissipation of heat from the second heatsink. As shown, the fan 1140 may be installed below the outer pot 1030, and openings 1160 may be provided in the base 1010 of the cooker 1000, such that air from the fan may exit the housing main body 1020.

In this way, the cooker 1000 uses the heat transfer module 1150 to transfer heat from the first heatsink 1120 to the second heatsink 1130, and the fan 1140 may assist the second heatsink in dissipating heat from the second heatsink.

The heating system 1110 comprises a heating element 1170, and is typically located on an inside bottom of the outer pot 1030. The inner pot 1040 then rests directly above the heating element 1170 when the inner pot is nested inside the outer pot 1130.

Figure 9:
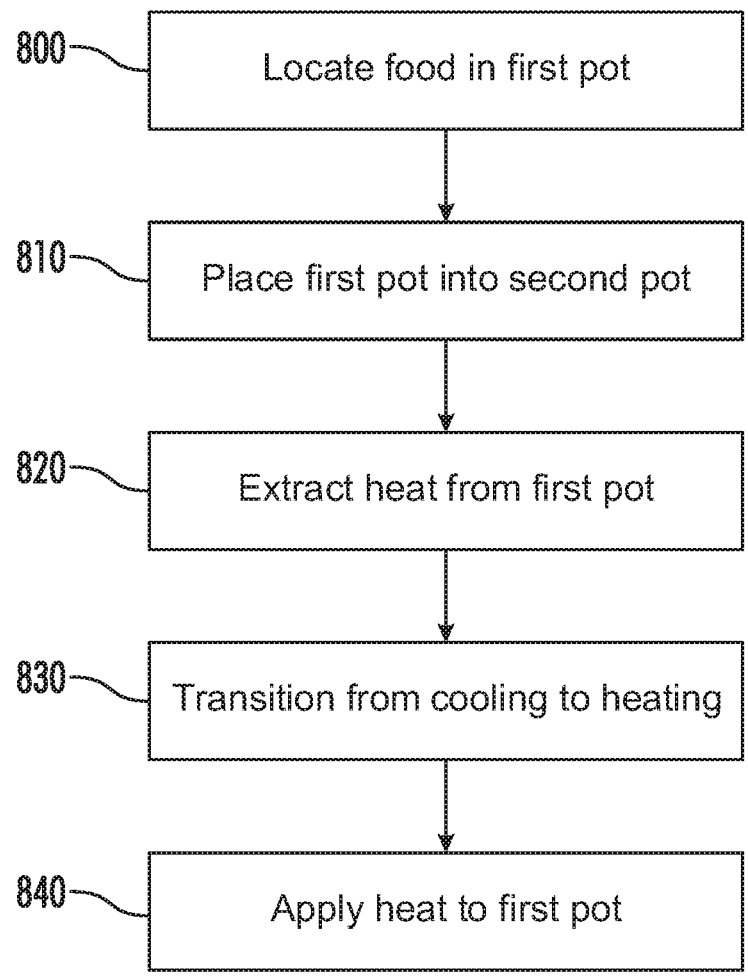
FIG. 9 is a flowchart illustrating a method for heating food using a cooker.

FIG. 9 is a flowchart illustrating a method for heating food using a cooker 105. In order to heat food in such a cooker 105, a user may first locate food in a first pot, such as inner pot 400 (800). The inner pot 400 may then be refrigerated prior to use, or it may be immediately placed into a second pot (810), such as outer pot 220.

After the food is located in the first pot 400, heat is extracted from the first pot during a first time period (820) while the cooker is in a cooling configuration. While in the cooling configuration, heat is extracted from the first pot by way of the cooling system, and the controller typically maintains the cooker 105 in the cooling configuration by activating the cooling system is active and maintaining the heating system as inactive.

Upon conclusion of the first time period, the cooker is transitioned (830) from the cooling configuration to a heating configuration. Once in the heating configuration, heat is applied (840) to the first pot by way of the heating system.

Various user interfaces may be implemented. In some embodiments, the placing of the first pot 400 into the second pot 220 may initiate the first time period. In other embodiments, the controller may be programmed to maintain the cooker 105 in the cooling configuration for a first time period set by the user and then transitioning the cooker to the heating configuration. Accordingly, the time periods may be set independently by a user.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A cooker comprising:
   an inner pot including an outer side wall, the outer side wall of the inner pot extending upward;
   a cooling system coupled to the inner pot for cooling the inner pot;
   a heating system coupled to the inner pot for heating the inner pot;
   a processor configured to control the cooling system and the heating system according to a programmed sequence, and
   an outer pot,
   wherein the inner pot nests within the outer pot, and the outer pot includes an inner side wall,
   wherein the cooling system includes a first heatsink that is in contact with the inner pot, and the heating system is separated from the first heatsink of the cooling system,
   wherein the first heatsink of the cooling system extends inward from the inner side wall of the outer pot to directly support the outer side wall of the inner pot, such that the inner pot is spaced apart from the inner side wall of the outer pot.

2. The cooker of claim 1, wherein the cooling system comprises:
   a second heatsink configured to dissipate heat into an environment; and
   a heat transfer module;
   wherein a cold side of the heat transfer module is coupled to the first heatsink and a hot side of the heat transfer module is coupled to the second heatsink, and the heat transfer module transfers heat from the first heatsink to the second heatsink.

3. The cooker of claim 2, wherein the cooling system further comprises a fan configured to enhance heat dissipation into the environment.

4. The cooker of claim 2, wherein the heat transfer module is a Peltier module.

5. The cooker of claim 1, wherein the processor is configured to control at least one of: power level, start time, and end time of the respective cooling and heating systems.

6. The cooker of claim 1,
   wherein the first heatsink comprises a portion mounted to an inner side wall of the outer pot, the inner side wall of the outer pot extending upward from an inner bottom surface of the outer pot, and the first heatsink includes a contact surface, the contact surface of the first heatsink is in contact with and is shaped to conform with the outer side wall of the inner pot for thermal coupling, the outer side wall of the inner pot extending upward from an outer bottom surface of the inner pot.

7. The cooker of claim 6, wherein the heating system comprises a heating element installed at the inside bottom of the outer pot, wherein the inner pot sits directly above the heating element when the inner pot nests with the outer pot.

8. The cooker of claim 1, wherein the heating system comprises a resistive heating element.

9. The cooker of claim 1, further comprising a user interface configured to receive user input commands.

10. The cooker of claim 1, further comprising a wireless interface configured to receive user input commands from a wireless device.

11. The cooker of claim 1, wherein the processor is configured to control the cooling and heating systems to perform multiple cooking functions.

12. The cooker of claim 1, wherein cooling system and the heating system are fixed to or integrated into the inner pot.

13. The cooker of claim 6, wherein the contact surface of the first heatsink of the cooling system extends along a circumferential direction of the outer side wall of the inner pot, and a dimension of the contact surface of the first heatsink along the circumferential direction is greater than a dimension of the contact surface of the first heatsink in a vertical direction.

14. The cooker of claim 6, wherein the cooling system includes a heat transfer module, wherein a cold side of the heat transfer module is coupled to the first heatsink, wherein the heating system comprises a resistive heating element under the outer bottom surface of the inner pot, and wherein each of the heat transfer module of the cooling system and the first heatsink of the cooling system overlaps with the outer side wall of the inner pot in a side view.

15. The cooker of claim 4, wherein the first heatsink of the cooling system extends from the Peltier module to the outer side wall of the inner pot past the outer side wall of the outer pot, such that the first heatsink of the cooling system directly supports the inner pot and spaces the inner pot away from the inner side wall of the outer pot.

16. A method for heating food comprising:

locating food in a first pot;

extracting heat from the first pot during a first time period by way of a cooling system;

applying heat to the first pot during a second time period by way of a heating system;

wherein the cooling system includes a first heatsink, the first heatsink is in contact with the first pot in the extracting heat during the first time period, in the applying of the second heat, the heating system is separated from the first heatsink of the cooling system, and wherein the first heatsink of the cooling system extends inward from an inner side wall of a second pot to directly support an outer side wall of the first pot, such that the first pot is spaced apart from the second pot, each of the outer side wall of the first pot and the inner side wall of the second pot extending upward.

17. The method of claim 16, wherein the cooling system comprises a second heatsink configured to dissipate heat into an environment, and a heat transfer module for transferring heat from the first heatsink to the second heatsink, and wherein the method further comprises coupling the first pot with the first heatsink and initiating the first time period.

18. The method of claim 16, further comprising inserting the first pot into the second pot prior to initiating the first time period, wherein the first heatsink comprises a portion mounted to the inner side wall of the second pot, the inner side wall of the second pot extending upward from an inner bottom surface of the second pot, and the first heatsink includes a contact surface, the contact surface of the first heatsink is in contact with and is shaped to conform with an outer side wall of the first pot for thermal coupling, the outer side wall of the first pot extending upward from an outer bottom surface of the first pot.

19. The method of claim 17, wherein the heating system comprises a resistive heating element, the method further comprises inserting the first pot into a second pot prior to initiate the first time period, and the resistive heating element is embedded into an inner bottom surface of the second pot, and the first pot sits directly above the resistive heating element.

20. The method of claim 16, wherein the extracting of the first heat from the first pot during the first time period is conducted prior to the applying the second heat to the first pot during the second time period.

* * * * *